United States Patent [19]

Van Atta

[11] 3,848,085

[45] Nov. 12, 1974

[54] LOW LIGHT LEVEL TELEVISION CAMERA
[75] Inventor: Peter W. Van Atta, Woodbridge, Va.
[73] Assignee: The United States of America as represented by the Secretary of the Army, Washington, D.C.
[22] Filed: Aug. 7, 1973
[21] Appl. No.: 386,485

[52] U.S. Cl............................ 178/7.2, 178/DIG. 29
[51] Int. Cl. ............................................. H04n 5/14
[58] Field of Search....... 178/7.2, DIG. 29, DIG. 11; 250/213 VT

[56] References Cited
UNITED STATES PATENTS
3,691,302  9/1972  Gaebele et al....................... 178/7.2
3,733,492  5/1973  Hagar........................... 250/213 VT
3,783,190  1/1974  Gaebele............................... 178/7.2

Primary Examiner—Robert L. Griffin
Assistant Examiner—Mitchell Saffian
Attorney, Agent, or Firm—Edward J. Kelly; Herbert Berl; Milton W. Lee

[57] ABSTRACT

A low light level television camera with automatic gain control of the vidicon output over a wide range of input light level. Cascaded gain mechanisms, avoiding non-linear control by functioning in a stepped manner are combined with electronic gating of an associated image intensifier for fine gain control, achieving a dynamic range of gain control approximately eight orders of magnitude.

6 Claims, 1 Drawing Figure

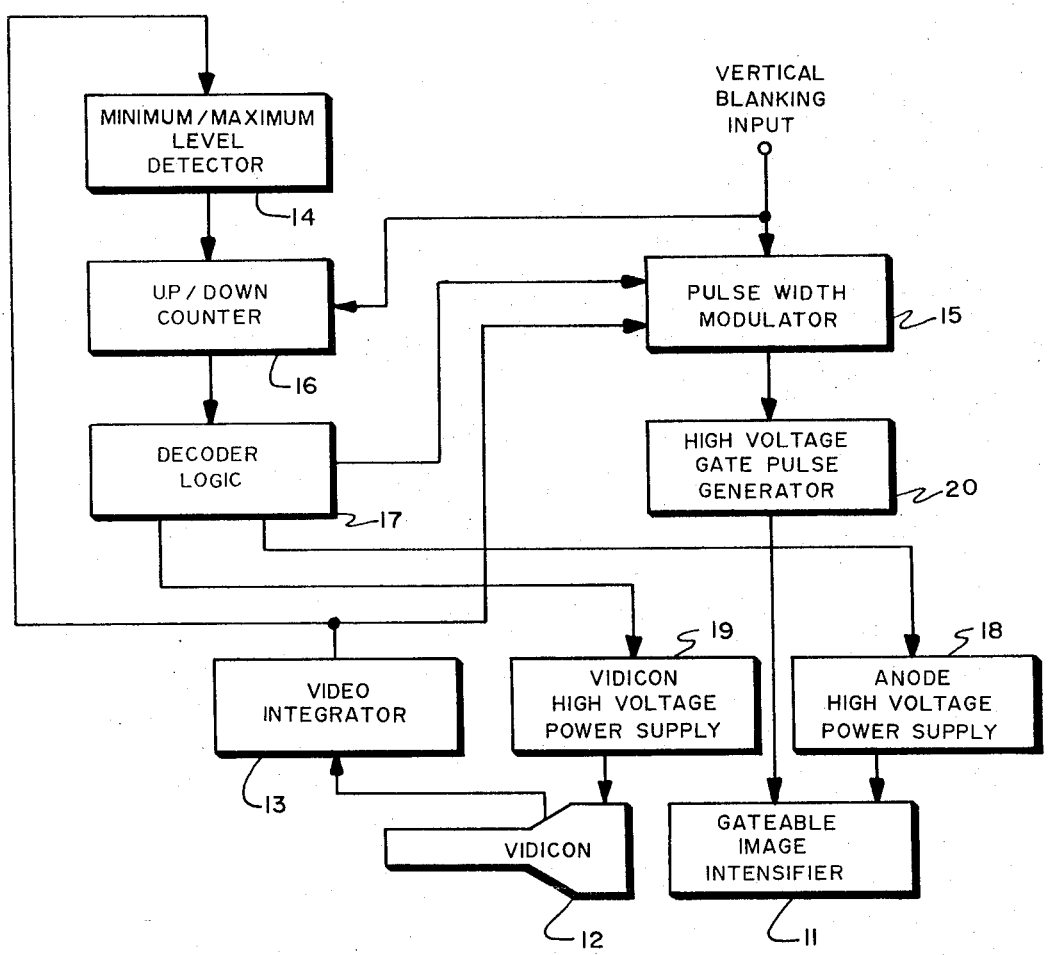

LOW LIGHT LEVEL TELEVISION CAMERA

The invention described herein may be manufactured, used, and licensed by or for the Government for governmental purposes without the payment to me of any royalty thereon.

FIELD OF THE INVENTION

The invention described herein relates to the automatic gain control of a low light level television camera. Such a camera, including an image intensifier device interfaced with a vidicon, is capable of functioning over a wide light level range, as for example, daylight condition down to moonlight level. In doing so, however, the output signal which will actuate a display device must be held within prescribed signal levels.

The instant invention accomplishes this gain control automatically over a range of approximately eight orders of magnitude through the use of these cascaded gain mechanisms which, by being operated in stepped fashion, change the intensifier and vidicon high voltage supplies thereby avoiding the problem of non-linearity; while, simultaneously, achieving fine gain control by applying a controlled variable pulse gating technique to the image intensifier.

DESCRIPTION OF THE PRIOR ART

Typical automatic gain control mechanisms for vidicon cameras have employed iris control located ahead of the camera tube. Voltage control of high voltages on the vidicon or image intensifiers as gain control has also been employed. The principal disadvantage of these earlier techniques is the limited dynamic control range wherein control was possible over only several orders of magnitude of change in light input.

Because voltage control of gain in image intensifiers and vidicons is a non-linear function, feedback design becomes very complex if more than one gain control mechanism is used in cascade.

SUMMARY

This invention overcomes the above stated disadvantages of existing devices. The problem of non-linearity of gain control over a wide dynamic range is met by operating cascaded gain mechanisms i.e., the image intensifier and the vidicon, in stepped voltage fashion. Pulse width control of a gated image intensifier is utilized to obtain fine gain control in the system. This is accomplished by turning the image intensifier on and off (gating) for different periods, whereby the image brightness is finely varied within the course range provided by the stepped gain change. The gain control functions in response to an integrated signal which is representative of the average scene brightness.

The result is an automatic gain control system having fast response to input light changes over an extremely wide range of light levels and one which avoids the complications of non-linear gain control.

BRIEF DESCRIPTION OF THE DRAWING

The FIGURE is a system diagram of the contemplated invention.

DESCRIPTION OF THE PREFERRED EMBODIMENT

The low light level television camera consists of a gateable image intensifier 11 and vidicon 12. The automatic gain control system associated with this camera operates in the manner hereinafter described. A video integrator 13 repeatedly integrates one field of the video from the vidicon 12 and derives an average signal level therefrom; which signal is fed to a comparator 14, which takes the form of a minimum/maximum level detector, and to a pulse width modulator 15 simultaneously. The comparator 14 determines whether the average signal level from the vidicon is within the prescribed limits. If the signal level is outside the prescribed limits, an appropriate corrective signal is generated by the comparator 14 and fed to the up/down counter 16 commanding it to count up or down as required. The counter 16 in turn provides signals to a decoder 17. It is the function of the decoder 17 which consists of, for example, Binary Coded Decimal (BCD) to decimal decoder and a network of logic gates, to control the image intensifier anode power supply 18 and the vidicon power supply 19 by providing the appropriate logic signal that causes the voltages in these power supplies to be stepped up or down as required to thereby bring the video output average signal level within the desired range. The up/down counter 16 could also be associated with a combinational logic network to provide the necessary signals that step the voltages of the power supplies 18 and 19. A signal is also sent from the decoder 17 to the pulse width modulator 15; which signal is determined by the voltage range into which the power supplies 18 and 19 have been stepped as represented by a particular output count of the up/down counter 16. The pulse width modulator 15 now has received two control signal inputs. One signal being received from the video integrator 13 and being associated with fine pulse width control and the other signal being the voltage range signal (coarse gain control) from the decoder 17. The pulse width modulator 15 has been designed to utilize these two signals to control the duty cycle by varying the pulse width signal to the gateable image intensifier. Within the various stepped ranges of gain control, the decoder output to the modulator providing this information, different ranges of pulse width control are available. In this way the pulse width control achieves fine gain control for the system.

The output of the modulator 15 then operates a gate pulse generator 20 which applies the gating pulse to the image intensifier 11 thereby "turning on" the image intensifier for the prescribed time period.

While the pulse width modulator 15 determines the pulse width signal that is generated, it is necessary to have a means for initiating or timing the action of the entire system. This is accomplished using a vertical blanking signal which would normally be derived from the synch generator of the television camera; though independent pulse generators could be used. This provides the necessary timing signals to the up/down counter 16 and to the pulse width modulator 15.

While only one embodiment of the contemplated invention has been described, it is to be understood that many variations, substitutions and alterations may be made while remaining within the spirit and scope of the invention which is limited only by the following claims.

I claim:
1. A low light-level television camera capable of operating over a wide range of input light levels and comprising:
 a cascaded gateable image intensifier and vidicon;

means for generating an average signal level output from the vidicon;

means responsive to said vidicon average signal output for generating a stepped gain control corrective signal;

power supplies associated with said image intensifier and vidicon, said power supplies having means for providing stepped gain voltage change to the image intensifier and vidicon in response to said corrective signal, thereby providing wide range coarse gain control; and means responsive to a signal indicative of said stepped voltage change and to the average signal level output for producing a variable pulse width signal input to said gateable image intensifier, whereby wide range fine gain control of said camera is obtained.

2. The device according to claim 1 wherein said means for generating an average signal level output comprises a video integrator; and said means for generating a corrective signal comprises a minimum/maximum level detector circuit, an up/down counter and decoder logic circuitry generating said corrective signal.

3. The device according to claim 2 wherein the means for producing a variable pulse width signal comprises a pulse width modulator and a high voltage pulse generator.

4. The device according to claim 3 wherein a vertical blanking signal provides timing signals to said pulse width modulator and said up/down counter circuit.

5. An automatic gain control system for a low light level television camera having a gateable image intensifier, a vidicon and power supplies associated therewith and comprising:

means responsive to the vidicon output for generating an average signal level;

comparator means for comparing said average signal level with a desired signal level range and for providing corrective signal outputs;

decoder means responsive to said corrective signal output for providing a control output to said power supplies for changing the voltages thereof in stepped increments thereby obtaining coarse gain control; and pulse width modulator means simultaneously responsive to the control output from the decoder and to the average signal level from the vidicon for generating a pulse width control signal for a pulse generator operating said gateable image intensifier, whereby the pulse width variations provide fine gain control.

6. A method for automatic gain control of a low light-level vidicon comprising the steps of:

coupling a gateable image intensifier to the input of said vidicon for providing an intensified image signal thereto;

determining the average output signal level of the vidicon;

comparing the average output signal level of the vidicon with a desired signal level;

controlling the gain of the image intensifier and vidicon in discrete step levels in accordance with the changing output signal of said vidicon;

controlling the pulse width of the gateable image intensifier for fine gain control in response to signals representative of both the discrete step gain level and the average signal level, whereby precise gain control is achieved over a wide input light level range.

* * * * *